United States Patent
Yang et al.

(10) Patent No.: US 10,497,034 B2
(45) Date of Patent: Dec. 3, 2019

(54) AUTO ADAPTIVE ANOMALY DETECTION SYSTEM FOR STREAMS

(71) Applicants: Linyu Yang, San Diego, CA (US); Joseph P. Milana, San Diego, CA (US)

(72) Inventors: Linyu Yang, San Diego, CA (US); Joseph P. Milana, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 0 days.

(21) Appl. No.: 16/215,590

(22) Filed: Dec. 10, 2018

(65) Prior Publication Data
US 2019/0108562 A1    Apr. 11, 2019

Related U.S. Application Data

(63) Continuation of application No. 11/825,527, filed on Jul. 6, 2007, now Pat. No. 10,152,736.
(Continued)

(51) Int. Cl.
| | |
|---|---|
| *G06Q 30/00* | (2012.01) |
| *G06Q 30/06* | (2012.01) |
| *G06Q 30/02* | (2012.01) |

(52) U.S. Cl.
CPC ......... *G06Q 30/06* (2013.01); *G06Q 30/0246* (2013.01); *G06Q 30/0248* (2013.01); *G06Q 30/0645* (2013.01)

(58) Field of Classification Search
CPC ............... G06Q 30/06; G06Q 30/0246; G06Q 30/0248; G06Q 30/0645
(Continued)

(56) References Cited

U.S. PATENT DOCUMENTS

| | | | | |
|---|---|---|---|---|
| 4,643,453 | A | * | 2/1987 | Shapiro ................. G06K 19/10 235/380 |
| 5,819,226 | A | | 10/1998 | Gopinathan et al. |

(Continued)

FOREIGN PATENT DOCUMENTS

WO    WO-2008/005526 A2    1/2008

OTHER PUBLICATIONS

Gandhi, Mona, et al. "Badvertisennents: Stealthy Click Fraud with Unwitting Accessories." Journal of Digital Forensic Practice, vol. 1, 2006. (Year: 2006).*

(Continued)

*Primary Examiner* — Luis A Brown
(74) *Attorney, Agent, or Firm* — Mintz Levin Cohn Ferris Glovsky and Popeo, P.C.

(57) ABSTRACT

A computer-implemented method and system for detecting fraud in electronic commerce traffic are disclosed. A global conversion rate is defined that represents activity related to a purchase made or proxy activity executed during electronic commerce traffic to a commercial website that is indicative of non-fraud activity. Subsets of the electronic commerce traffic to a commercial website are monitored for clusters of activity having a conversion rate that is lower than a global conversion rate by a threshold margin. A number of user-initiated input signals from an input device to navigate from each of one or more affiliate websites to the commercial website, and a number of conversions generated from each of the one or more affiliate websites, are registered by a computer for analysis.

17 Claims, 3 Drawing Sheets

Related U.S. Application Data

(60) Provisional application No. 60/806,701, filed on Jul. 6, 2006.

(58) Field of Classification Search
USPC .................................. 705/14.4, 14.47, 14.45
See application file for complete search history.

(56) References Cited

U.S. PATENT DOCUMENTS

| | | | | |
|---|---|---|---|---|
| 6,006,260 | A * | 12/1999 | Barrick, Jr. | G06F 11/3419 709/202 |
| 6,094,643 | A * | 7/2000 | Anderson | G06Q 20/04 235/379 |
| 6,286,005 | B1 | 9/2001 | Cannon | |
| 6,330,546 | B1 * | 12/2001 | Gopinathan | G06Q 20/00 705/35 |
| 6,597,775 | B2 * | 7/2003 | Lawyer | H04M 15/00 379/112.01 |
| 6,839,682 | B1 * | 1/2005 | Blume | G06Q 30/02 705/14.4 |
| 6,873,979 | B2 * | 3/2005 | Fishman | G06Q 99/00 706/21 |
| 6,877,007 | B1 * | 4/2005 | Hentzel | G06Q 30/02 707/999.01 |
| 7,089,592 | B2 * | 8/2006 | Adjaoute | G06Q 20/04 726/1 |
| 7,574,382 | B1 * | 8/2009 | Hubert | G06Q 10/00 705/26.61 |
| 7,657,626 | B1 * | 2/2010 | Zwicky | G06Q 30/02 705/51 |
| 7,734,502 | B1 * | 6/2010 | Yehoshua | G06Q 30/02 705/14.47 |
| 7,933,984 | B1 * | 4/2011 | Smith | G06Q 10/0639 709/224 |
| 8,655,724 | B2 * | 2/2014 | Chow | G06Q 10/0635 705/14.47 |
| 8,694,374 | B1 * | 4/2014 | Diligenti | G06Q 30/02 705/14.47 |
| 8,751,300 | B2 * | 6/2014 | O'Sullivan | G06Q 10/101 705/14.26 |
| 8,880,541 | B2 * | 11/2014 | Hill | G06F 16/958 707/758 |
| 8,996,404 | B2 * | 3/2015 | Ha | G06Q 30/02 705/14.4 |
| 9,251,522 | B2 * | 2/2016 | O'Sullivan | G06Q 30/02 |
| 9,349,134 | B1 * | 5/2016 | Adams | G06F 21/53 |
| 9,734,508 | B2 * | 8/2017 | Kouladjie | G06Q 30/02 |
| 9,754,311 | B2 * | 9/2017 | Eisen | H04L 63/0876 |
| 2002/0029194 | A1 * | 3/2002 | Lewis | G06Q 20/10 705/39 |
| 2002/0099649 | A1 | 7/2002 | Lee et al. | |
| 2002/0161648 | A1 * | 10/2002 | Mason | G06Q 30/02 705/14.61 |
| 2002/0194119 | A1 * | 12/2002 | Wright | G06Q 20/04 705/38 |
| 2004/0254813 | A1 * | 12/2004 | Messer | G06F 21/10 705/26.44 |
| 2005/0080685 | A1 * | 4/2005 | Blum | G06Q 30/06 705/26.1 |
| 2005/0182712 | A1 * | 8/2005 | Angell | G06Q 20/10 705/39 |
| 2006/0062471 | A1 | 3/2006 | Xu et al. | |
| 2006/0080239 | A1 | 4/2006 | Hartog | |
| 2006/0136294 | A1 * | 6/2006 | Linden | G06Q 30/0257 705/14.47 |
| 2006/0167704 | A1 * | 7/2006 | Nicholls | G06Q 10/06393 705/7.39 |
| 2006/0212350 | A1 * | 9/2006 | Ellis | G06Q 30/0242 705/14.41 |
| 2006/0265493 | A1 * | 11/2006 | Brindley | G06Q 30/02 709/224 |
| 2007/0073579 | A1 * | 3/2007 | Immorlica | G06Q 30/0248 705/14.47 |
| 2007/0083519 | A1 * | 4/2007 | Daniels | G06Q 30/00 |
| 2007/0124194 | A1 * | 5/2007 | Barnette, Jr. | G06Q 30/02 705/14.46 |
| 2007/0129999 | A1 * | 6/2007 | Zhou | G06Q 30/0248 705/14.47 |
| 2007/0179849 | A1 * | 8/2007 | Jain | G06Q 30/02 705/14.41 |
| 2007/0192190 | A1 * | 8/2007 | Granville | G06Q 30/02 705/14.69 |
| 2007/0239604 | A1 * | 10/2007 | O'Connell | G06Q 30/06 705/50 |
| 2007/0255821 | A1 * | 11/2007 | Ge | G06Q 10/00 709/224 |
| 2007/0282699 | A1 * | 12/2007 | Kumar | G06Q 30/02 705/26.62 |
| 2008/0162227 | A1 * | 7/2008 | Jakobsson | G06Q 10/063 705/7.37 |
| 2008/0270154 | A1 * | 10/2008 | Klots | G06Q 30/02 705/14.4 |
| 2008/0275916 | A1 * | 11/2008 | Bohannon | G06Q 10/06 |
| 2013/0073473 | A1 * | 3/2013 | Heath | G06Q 30/02 705/319 |

OTHER PUBLICATIONS

Asdemir, Kursad, et al., "Legal and Strategic Perspectives on Click Measurement." researchgate.net, Jul. 2006. (Year: 2006).*

International Search Report for related patent PCT/US2007/15564 performed by International Searching Authority/US dated Sep. 17, 2008. 3 pages.

Written Opinion for related patent PCT/US2007/15564 performed by International Searching Authority/US dated Sep. 17, 2008. 6 pages.

* cited by examiner

AUTO ADAPTIVE ANOMALY DETECTION SYSTEM FOR STREAMS

CROSS REFERENCE TO RELATED APPLICATION

This application is a continuation of U.S. application Ser. No. 11/825,527, filed on Jul. 6, 2007, and entitled AUTO ADAPTIVE ANOMALY DETECTION SYSTEM FOR STREAMS, the disclosure of which is incorporated herein by reference. The present patent application claims priority under 35 U.S.C. § 119 to U.S. Provisional Patent Application Ser. No. 60/806,701 filed on Jul. 6, 2006 and entitled, "Anomaly Detection System" the entire disclosure of which is incorporated by reference herein.

BACKGROUND

This disclosure relates to detecting anomalous behavior in a computer system or computer network.

Search engines derive revenue based in large part on computer user actions. For example, Pay-Per-Click (PPC) advertising, also known as Cost Per Click (CPC), is one example of a business model by which some search engines derive most or all of their revenue. Advertisers pay a search engine to place links to a website onto web pages that the search engine controls. A typical example is the border of "sponsored ads" that are returned along with the "organic" or "natural" results from a normal search. The search engine is paid each time a consumer clicks upon a displayed link. Advertisers compete in an auction process for having their links placed in the premium central location of the displayed ads.

Beyond the revenue generated from PPC Search, an equally sizable revenue stream arises from the placement of sponsored ads on other websites that have joined a search engine's network of affiliates. In this arrangement, a cooperating affiliate website allots the search engine space on their web page for placement by the search engine of advertisements that are deemed "relevant" to visitors of the website. The affiliate shares in the revenue generated by the click-through traffic.

As usually occurs, concomitant with the creation of a new business has been the onset of a new fraud: Click Fraud. Click Fraud is generically defined as the creation of click traffic solely for the purpose of driving up the advertiser's costs. There is no intent of "shopping". There are two major varieties of Click Fraud:

1) Malicious competition, wherein the sole purpose is to damage an advertiser's marketing budget. As advertisers typically specify daily spending limits with the search engines, there exists the potential for an entity to eliminate competition by flooding their competition with false traffic. Such motivation is most effective against competitors with limited spending budgets. A risk for retaliation requires that the source of the traffic be concealed, i.e. lack any tags to the source. One version of this fraud variety is to generate false traffic for the purpose of eroding the brand name of a particular search engine.

2) Fraud for profit. Here the goal is the direct collection of advertiser dollars. The criminals exploit the cooperative network arrangements to join a search engine's merchant network after having created a fictitious website. Revenue can then be manufactured by simply clicking on the links thus inserted by the search engine.

The true scale of the Click Fraud problem is unknown: industry estimates range from 0.5% up to 20% and beyond. Even a modest estimate of 5% translates into click fraud being a problem comparable to all of U.S. credit-card fraud. The ambiguity in determining the click fraud rate resides in the fact that unlike credit-card fraud, where there is a consumer examining a monthly bill, in the case of PPC traffic there is usually no objective reviewer that can determine what is valid and what is fraud.

The absence of tags implies that click fraud detection translates into an anomaly detection problem. The goal is to identify in the stream of clicks arriving at an advertiser's site outliers that are anomalous in a manner indicative of the major fraud types described above. For merchants with a large ecommerce channel, one can with almost complete confidence label visits that consummate in a purchase as unambiguously non-fraud. One caveat relates to chargebacks: some fraud can be directly attacked using other monitoring systems, see e.g., U.S. Patent Appl. 20020099649 (Feb. 12, 2001) "Identification and Management of Fraudulent Credit/Debit Card Purchases at Merchant Ecommerce Sites". At the moment there is little evidence that perpetrators of click fraud are masking their attacks by generating fraudulent purchases. It is unlikely they ever will, as there are much more direct and lucrative outlets to extract financial gain from a compromised payment card than by conducting click fraud.

SUMMARY

In general, this document discusses an anomaly detection system and method for identifying click fraud, a new form of fraud associated with the PPC business model of the search engines for Internet advertising. What may prove structural with this business model is the lack of a clean set of fraud tags. However, by tracking the activity of web visits on the advertiser site, one can confidently label visits that are not fraud. Pathological PPC traffic can thus be identified as slices of a total advertisers volume with anomalously low rates of clearly labeled non-fraud activity, i.e. "conversions" whereby a user eventually makes a purchase or consummates the visit with some other feedback deemed valuable by the advertiser (e.g. making a reservation).

A multiple-entity profiling system is used to auto-adaptively define normal visitor behavior for each advertiser's site. A "click" (web visit) is then scored using a judgmental model based upon conversion rates that ranks the level that the click is associated with pathological traffic. A panel of experts provides a sanity check of the scoring patterns generated. The methodology can be obviously extended to other data streams wherein the lack-of-something good having happened can be likewise clearly defined.

In one aspect, a computer-implemented method for detecting fraud in electronic commerce traffic includes determining a global conversion rate for electronic commerce traffic to a commercial website. The conversion rate defines activity related to a purchase made or proxy activity executed that is indicative of non-fraud activity. In some implementations, a method further includes monitoring subsets of the electronic commerce traffic to the commercial website for clusters of activity having a conversion rate that is lower than the global conversion rate by a threshold margin.

In another aspect, a computer-implemented method for detecting fraud in electronic commerce traffic includes defining a global conversion rate that represents activity related to a purchase made or proxy activity executed during electronic commerce traffic to a commercial website that is indicative of non-fraud activity. In some implementations, a method further includes monitoring subsets of the electronic commerce traffic to a commercial website for clusters of activity having a conversion rate that is lower than a global conversion rate by a threshold margin.

In yet another aspect, a system for detecting fraud in electronic commerce traffic includes a global conversion rate definition tool defining a global conversion rate that represents activity related to a purchase made or proxy activity executed during electronic commerce traffic to a commercial website that is indicative of non-fraud activity. In some implementations, a system further includes a web traffic monitor configured to monitor subsets of the electronic commerce traffic to a commercial website for clusters of activity having a conversion rate that is lower than a global conversion rate by a threshold margin.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
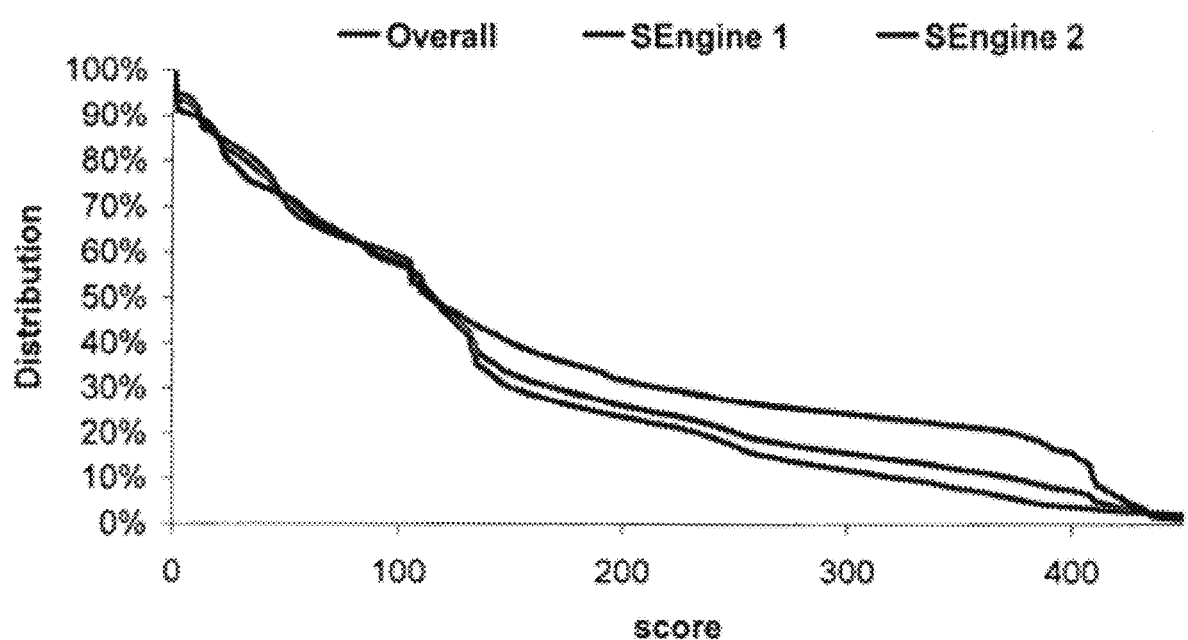
FIG. 1 illustrates a representative score distribution for affiliate traffic on one advertiser.

This document describes an Auto-adaptive Anomaly Detection System for Streams (AADSS) and methods thereof. AADSS includes implementations to detect anomalies in online commercial transactions, in order to identify Click Fraud and other types of fraud.

A key to any anomaly system is the definition of a baseline. As each advertiser has its own specific traffic flows with corresponding click stream on the advertiser's site itself, an appropriate baseline should be advertiser-specific. While most web visits generally do not result in a purchase, tracking the rate of conversions provides a natural metric to use as a baseline: click fraud manifests itself as clusters of the total traffic with anomalously low conversion rates. For advertiser sites without purchases, proxies (e.g. downloads, form fills, etc.) are necessary to define successful, non-fraud activity.

A system and method in some implementations uses multiple-entity profiling to auto-adaptively define normal visitor behavior for each advertiser's site. A "click" (web visit) is then scored using a judgmental model that ranks the level that the click is associated with pathological traffic based upon conversion rates. A panel of experts provides a sanity check of the scoring patterns generated. The methodology can be obviously extended to other data streams wherein the lack-of-something good having happened can be likewise clearly defined.

Three core-profiling keys are used to identify anomalous clusters in the affiliate network with low conversion rates: 1) Affiliate website profiles; 2) IP address profiles; 3) Campaign ID profiles. Presently each of these are advertiser-specific, especially to compare against an appropriate baseline, although the first two profiles may be augmented with a global view of conversion traffic across advertisers. The global view's value is somewhat proportional to coverage of any landscape of advertisers, and thus such global view is preferably as comprehensive as possible. However, such coverage is not needed to reliably identify pathological traffic on any given advertiser.

The simplest metrics that are tracked are the number of clicks and the number of conversions generated from each affiliate website. From this a conversion rate is computed that is compared against a global conversion rate (for a specific advertiser) across all affiliates. To account for nuances in how each of the major search engines build their network of affiliates, as well as determine which links to place on a given affiliate's site, a global profile can be defined for each search engine separately.

To address statistical significance of a tallied conversion rate, one of several smoothing procedures can be employed. In some implementations, one of two main smoothing algorithms can be executed by the AADSS: one that squashes the computed ratio of conversion rates based upon $\chi^2$ statistics; and another that employs a mixing-based approach, in which the conversion rate is calculated by mixing in a specified and tunable number of clicks with the global average conversion rate. The $\chi^2$ statistic is obtained by using the global conversion rate (across all affiliates for a given search engine) to compute the expected number of conversions given the observed traffic of clicks from a given affiliate. The statistic is then, by definition, the square of the difference between the observed number of conversions and the expected number, all divided by the expected number (the Poisson estimate for the square of the standard deviation of the expected number). A sigmoid squashing function $f(\chi^2)$ is then generated for any variable entering the judgmental model (see below), where the squashing function is parameterized such that $f(\chi^2=0)=0$ ; $f(\chi^2\to\infty)\to 1$, and the value "b" that $f(\chi^2=b)=\frac{1}{2}$ is a tunable parameter with b typically ~2.

This methodology is extended to track affiliate conversion rates over selected time periods (daily, weekly, monthly) by adding to the respective profiles tallies for the "last" selected time periods, i.e. the last seven days and for the last 14 weeks (where a rolling definition of "last" is used to age-off the respective tallies by overwriting them with the current quantities). To avoid double counting when combining the results over the respective time periods, when computing overlapping quantities as input into the judgmental model, precedence can be given to the statistic with the largest anomalous value.

For IP address profiling, other elements other than simply the conversion rate tallies described above are included for the case of the affiliate profiles. To react to potentially suspicious high velocity activity from a given IP address, two ingredients can be implemented: 1) time decayed velocity variables, as described in U.S. Pat. Nos. 5,819,226 and 6,330,546, the contents of which are hereby incorporated by reference for all purposes, and; 2) global profile variables that tally (across all IP addresses) the conversion rates whenever an IP address velocity falls within a certain range of velocities. So for example, one set of data might cover IP velocities greater than 3 but less than 6. Whenever any IP address (across all affiliates) achieve a velocity in this range, the global profile tally for the number of clicks and for the number of converts for this set of data is updated. A smoothed conversion rate is then computed using the global profile's velocity tallies and ultimately compared against the overall (global) conversion rate as input to the judgmental model.

In some implementations, knowledge of the IP address is augmented with geo-location data as provided by such data vendors as Digital Envoy and Quova. The appended data is converted into a ratio of conversion rates using the same methodology as described for velocities, but where now sets of data are defined by the geo-location elements. So for example, if an IP address is returned as an anonymous proxy, global tallies for all anonymous proxies (on affiliate sites) is used to identify a potential anomalous cluster.

A third core profile tracks the velocity of traffic for a specific campaign from each affiliate site. It is unclear whether such profiles are actually identifying fraud-for-profit or in fact malicious competition (from which an affiliate coincidentally benefits). However the dependence on the affiliate site naturally places this potential anomalous activity within the present description rather than that of the description below. An outlier is determined as previously: for an achieved velocity, the conversion rate tallied across all affiliate sites for campaigns achieving similar velocities (as specified by a range in which the particular velocity falls) is compared against the global conversion rate for that search engine, since campaigns are search engine-specific. As mentioned earlier, these conversion rates can be further delineated to reflect more recent trends, as well as fluctuations across a week by bifurcating by each day of that week.

In the judgmental model, a score, S, is generated for each click that intends to rank the pathology of the traffic according to the following model:

$$S = 1000 \frac{1}{1 + e^{\alpha_0 + \Sigma \alpha_i z_i}} \quad (1)$$

In preferred implementations, a fraud score is prescribed to a range of values, for example from 1 to 999, with high scores reflecting higher fraud ranking although the ranking can also be established where low scores reflect a higher fraud ranking. The parameter $\alpha_0$ reflects the score that an "average" click associated with the global conversion rate will receive. For convenience, such global averages can be selected to receive a score of 100. The above model can be augmented so that all conversions are given a score $S=1$, so in fact (1) applies only to non-converting traffic.

The variables $z_i$ are the smoothed ratio of conversion rates discussed above. For the case that smoothing is performed using mixing:

$$z_i = \frac{conv(i) - \mu(i)}{\mu(i)}, \quad (2)$$

$$conv(i) = \frac{\text{\#converts in cluster } "i" + \kappa * \mu(i)}{\text{\#clicks in cluster } "i" + \kappa}.$$

Where $\mu(i)$ is the appropriate global conversion rate for each cluster as discussed above.

In the case that the data was fully tagged, the values of the coefficients $\alpha_i$ in Eq. (1) can be determined by training a logistic regression model. In a preferred implementation they are selected judgmentally. As each of the clusters independent is preferably kept independent, any biases can be minimized by setting $\alpha_i = 1$ for all i except the first cluster tracking the conversion rate for the individual affiliate site, for which $\alpha_1 = 2$ is set, thereby emphasizing the importance of this statistic.

FIG. 1 depicts a representative score distribution for affiliate traffic on one advertiser. Notice the dramatic rise at 400. The score would be typically used with a threshold whereby all clicks receiving a score above that threshold are regarded as highly suspicious. As shown in FIG. 1, 350 is one such reasonable threshold. Note that while the system scores each click, high scores are only generated once sufficient statistics are compiled for a given cluster. A retrospective analysis would thus identify a slightly larger volume of suspicious clicks: the precursors to the statistics that are driving high scores on a given cluster (e.g. an affiliate site, an IP address, etc.).

For malicious competitor type fraud, pulses of click activity are sought that have anomalously low conversion rates and that appear above a baseline volume of paid-search traffic. As normal activity varies significantly by keyword searched, the baseline conversion rate used for comparative purposes must be campaign-specific. This baseline rate can be further tracked by time of day and day of week, or by any other time or period, to reflect potential daily fluctuations. Indeed such granularity is only limited by the statistics that the total volume that an advertisers traffic can reliably support. To account for potential "recycling" of campaign keys by the advertiser, the profiles can be "aged-off", thereby restarting the baseline, when a sustained, precipitous drop in activity for a given campaign is found. The criterion used to trigger an age-off is a tunable parameter, e.g. when volumes are less than 10% of the expected for three consecutive days or more. This determination can be made for every new click that arrives.

Dependence on an expected background baseline volume can be implemented via a smoothing formula for conversion rates. Utilizing key-word/campaign profiles (constructed for these purposes on only traffic originating directly from the search engines, i.e. excluding the affiliate traffic from last section), atomic time units can be defined and the rolling number of clicks and converts can be tallied within each time unit, and then smoothed against the prorated expected number of clicks and converts for that key-word. For example, in an exemplary implementation the time unit is a single day. To handle potential systematic variation in the average volume across the week, accumulated statistics can be maintained for each day of the week. The smoothed conversion rate for a given day is then obtained as:

$$conv_{t=1day}(\text{key} - \text{word}) = \quad (3)$$
$$\frac{\text{\#converts today for given key} - \text{word} + \mu * V(d) * f}{\text{\#clicks today for given key} - \text{work} + V(d) * f}.$$

Where V(d) is the expected daily click volume for a particular key-word for the given day of a week plus a few (typically 1.5) standard deviations of the same quantity (thereby allowing for the case of regular large fluctuations in the said expectation), μ is the average conversion rate for that key-word on that particular day of the week, and where f is the fraction of the day that has thus elapsed. An input variable z to the judgmental model is then obtained as shown above in Eq. (2). As for the affiliate conversion rate, this input variable can be preferentially weighted in the judgmental model with a coefficient $\alpha=2$. Different time-units can be easily accommodated, although as mentioned earlier, to avoid potential double-counting, only one input should be allowed into the judgmental model by giving precedence to the velocity most severely anomalous.

The various IP address variables already discussed above can be added to these velocity variables (where though, all tallies are restricted to the traffic directly arising from paid search). Additionally, a variable that tracks the conversion rates associated with blank-URL referrers (a well known signal for potential scripting/robot activity) can be included. This cluster rate can be built analogously to IP geo-location.

Figure 2:
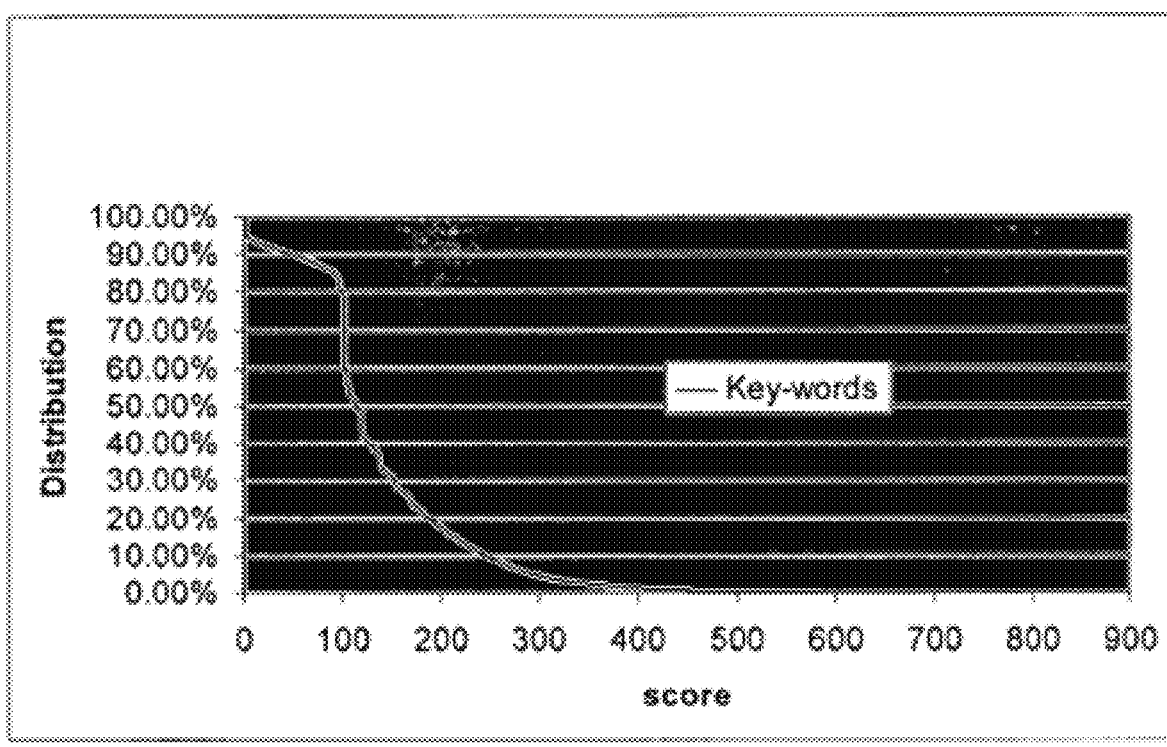
FIG. 2 illustrates a representative score distribution for paid search.

FIG. 2 depicts a representative score distribution for paid search. Similar to what is shown in FIG. 1, 350 is one reasonable threshold to regard as highly suspicious for all clicks receiving that score or above. Once again, a retrospective analysis would identify a slightly larger volume of suspicious clicks which include the precursors to the statistics that are driving high scores on a given keyword on a certain day.

As described and demonstrated above, approaches for identifying anomalies hinges on conversion data. Such data can only be obtained from each advertiser, and the preferred approach is indeed highly advertiser centric. The above-described approaches simply assumed that for a given advertiser there exists a clear definition of a conversion. For advertisers with a large e-commerce presence, purchases constitute the gold standard for such a definition. Provided such purchases are backed by an authentication process (as in the case of credit cards that additionally provide AVS checks), such conversions could only be tainted if the actual payment vehicle has itself been compromised. While such a scenario is considered unlikely, as there are more lucrative means of exploiting a compromised card than conducting click fraud, it can be noted that if such a migration did occur, and click fraud became heavily correlated with payment card fraud, then the stream of charge-backs that would be subsequently generated would result in a set of tags that would transition click fraud detection from an unsupervised to a supervised training problem.

For the case of advertisers without a prominent e-commerce channel, proxies are required. This generically involves either form fills or downloads. Such events can be called "soft-conversions". They are each susceptible to duplication by criminals, both by human as well as robotic means. Further analysis of the actual form fills themselves (focusing on duplicate or near duplicate entries) as well as the click-stream leading up to these soft conversions may identify obvious attempts to mask click fraud, such soft conversions are in the long-term vulnerable to attack as criminals devise ever more sophisticated scripts and/or click fraud schemes. A useful analogy from credit-card fraud is the case of "tumbling", where criminals probe for legitimate account numbers over the internet by automating form-fills with sequentially related candidate entries in the credit card number field. As these were easy to identify, criminals migrated to drawing from a list of pre-assigned, randomly distributed candidate numbers. Identifying such attacks today involve more subtle means, such as IP Address profiling, and form-fill analysis.

To help mitigate the susceptibility to false soft-conversions, advertisers should tie the conversions to a consumer contact channel, typically email. Downloads can, for example, preferentially involve sending the requested download to an email address. Likewise, form-fills can require an email address and be followed up with an email from the advertiser. These email addresses can be immediately probed for legitimacy (i.e., that they do not result in a bounced email). Emails to "free" email sites (e.g. hotmail, Yahoo, etc.) can likely be disqualified from entering conversion rates (thereby representing a third set of data of event visits). All emails can explicitly request a reply if received unexpectedly, as they would indicate that the address has likely been compromised. In this way, a closed-loop is formed that is used to retrospectively discount such visits as being "legitimate" converts, as well as to develop a data-base of fraud tags (albeit incomplete).

The last class of advertiser sites is those with no identifiable form of conversion. While click-stream activity could be used as a (very) soft proxy, these will be much more difficult, perhaps impossible, to harden against falsification. On the other hand, such sites also suffer from an inability to articulate a well-defined return-on-investment from their PPC advertising budget, so it is unlikely they will ever represent a large fraction of the PPC market.

This document has presented an anomaly detection system for detecting click fraud. At the core of the approach is the ability to track clear non-fraud events, and to identify clusters with anomalously low conversion rates of such events. While the present focus is related to individual advertiser data with IP geo-location data appends, a system and method for detecting anomalies can be implemented to relax each of these features.

A system with a full or nearly full view of the PPC market is able to cross-correlate activity across advertisers. This is particularly useful for detecting fraud for profit arising from suspicious affiliate sites, as all links would be expected to have anomalously low conversion rates (i.e. with respect to each individual advertisers baseline) and accumulatively (by extending the affiliate profile) can provide better statistics for earlier detection. Likewise the detection of malicious competitors would likely be accelerated in the case that a number of competitors are simultaneously attacked. Such attacks would be identifiable via an extended key-word profile that spans multiple advertisers.

The most salient data extension from those presently described can involve information related to botnets: i.e. networks of compromised (robotic) PCs controlled by a single master. These could be added to the systems and methods described above as a new input variable to the judgmental model that reflects tallied conversion rates from all IP Addresses suspected of having been compromised. More sophisticated extensions can track collective activity of a master (using new profiles), assuming that botnets are identified in cluster.

Figure 3:
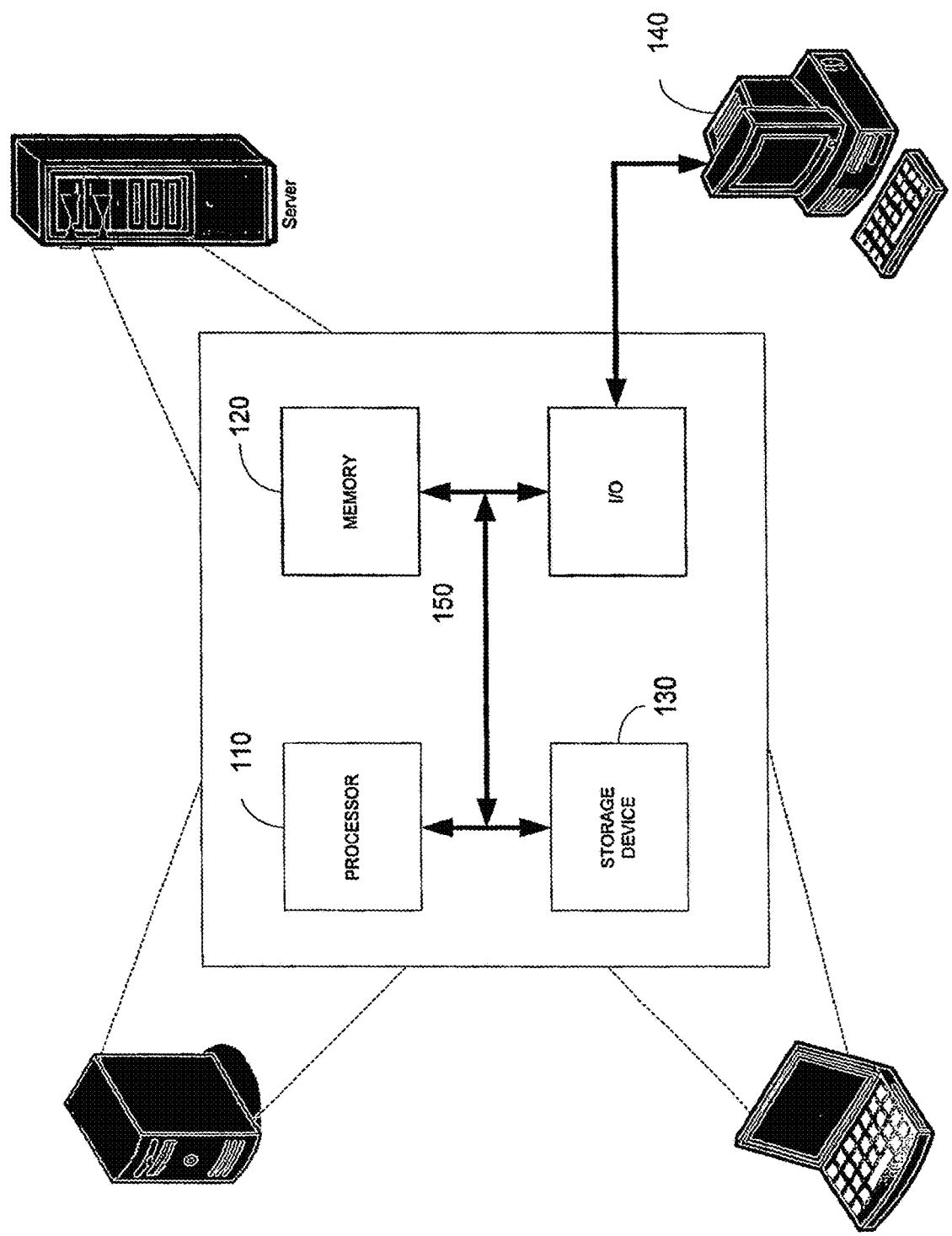
FIG. 3 shows a schematic diagram of a computer system on which an anomaly detection system and method can be implemented and executed.

The ideas described herein can be implemented in a computer system, and FIG. 3 therefore shows a schematic diagram of a computer system 100 on which an anomaly detection system and method can be implemented and executed. The system 100 can be used for the operations described in association with any of the computer-implement methods described previously, according to one implementation. The system 100 includes a processor 110, a memory 120, a storage device 130, and an input/output device 140. Each of the components 110, 120, 130, and 140 are interconnected using a system bus 150. The processor 110 is capable of processing instructions for execution within the system 100. In one implementation, the processor 110 is a single-threaded processor. In another implementation, the processor 110 is a multi-threaded processor. The processor 110 is capable of processing instructions stored in the memory 120 or on the storage device 130 to display graphical information for a user interface on the input/output device 140.

The memory 120 stores information within the system 100. In one implementation, the memory 120 is a computer-readable medium. In one implementation, the memory 120 is a volatile memory unit. In another implementation, the memory 120 is a non-volatile memory unit. The storage device 130 is capable of providing mass storage for the system 100. In one implementation, the storage device 130 is a computer-readable medium. In various different implementations, the storage device 130 may be a floppy disk device, a hard disk device, an optical disk device, or a tape device. The input/output device 140 provides input/output operations for the system 100. In one implementation, the input/output device 140 includes a keyboard and/or pointing device. In another implementation, the input/output device 140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, Subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet. The features and functions of the fraud detection system can be implemented in any type of networked environment, such as an application service provider (ASP) model, for example.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention.

The invention claimed is:
1. A computer-implemented method for detecting fraud in electronic commerce traffic, the method comprising:
  determining, by one or more processors, a global conversion rate for electronic commerce traffic to a commercial website, the conversion rate defining activity related to a purchase made or proxy activity executed that is indicative of non-fraud activity, the global conversion rate representing a fraction of the electronic commerce traffic that leads to the purchase or the proxy activity; and
  monitoring, by the one or more processors, subsets of the electronic commerce traffic to the commercial website for clusters of activity having a conversion rate that is lower than the global conversion rate by a threshold margin, the conversion rate representing a fraction of a subset out of the subsets of the electronic commerce traffic that leads to the purchase or the proxy activity, the monitoring subsets of the electronic commerce traffic to the commercial website further including:
    registering, by the one or more processors, a number of user-initiated input signals associated with an IP address to navigate from each of one or more affiliate websites to the commercial website, the IP address associated with geo-location data; and
    registering, by the one or more processors, a number of conversions generated from each of the one or more affiliate websites;
  detecting, by the one or more processors, a change in the electronic commerce traffic in an amount of the electronic commerce traffic above or below a predetermined threshold;
  scaling, by the one or more processors, the global conversion rate to be a scaled global conversion rate in accordance with the detected change, the scaling comprising adjusting, by the one or more processors, of a tunable parameter that modifies the global conversion rate, the adjusting based on the change;
  comparing, by the one or more processors, the scaled global conversion rate to each of the conversion rates in order to detect anomalous conversion rates;

generating, by the one or more processors, a score for each user-initiated input signal, wherein the score ranks the pathology of the traffic related to the user-initiated input signal;

comparing, by the one or more processors, the score to a threshold;

detecting, by the one or more processors, anomalous conversion rates based on the comparing of the scaled global conversion rate to each of the conversion rates, based on the geo-location data, and based on scores exceeding the threshold; and providing, by the one or more processors, data encapsulating the detection of the anomalous conversion rates to a user interface.

2. A method in accordance with claim 1, further comprising applying a smoothing algorithm to the registered number of conversions generated from each of the one or more affiliate websites to generate a statistically smoothed sample to detect a sharp peak of the clusters of activity having the conversion rate that is lower than the global conversion rate.

3. A method in accordance with claim 2, wherein the smoothing algorithm is based upon $\chi^2$ statistics.

4. A method in accordance with claim 2, wherein the smoothing algorithm is based upon calculating the conversion rate by mixing in a specified and tunable number of user-initiated input signals with the global conversion rate.

5. A method in accordance with claim 1, wherein monitoring subsets of the electronic commerce traffic to the commercial website further includes tracking an IP address from which the user-initiated input signals from the input device are received.

6. A method in accordance with claim 5, further comprising computing a smoothed conversion rate using a smoothing algorithm.

7. A method in accordance with claim 1, wherein monitoring subsets of the electronic commerce traffic to the commercial website further includes tracking traffic for a selected advertising campaign related to the commercial website.

8. A method in accordance with claim 7, further comprising applying a periodicity factor to the monitoring.

9. A method in accordance with claim 1, wherein the score is generated according to the model:

$$S = 1000 \frac{1}{1 + e^{\alpha_0 + \Sigma a_i z_i}}$$

where $\alpha_0$ is a score that an average user-initiated input signal associated with the global conversion rate will receive, and $z_i$ are the smoothed ratio of conversion rates.

10. A method in accordance with claim 1, wherein monitoring subsets of the electronic commerce traffic to the commercial website further includes monitoring for user-initiated input signals that are above a baseline volume of paid-search electronic commerce traffic.

11. A computer-implemented method for detecting fraud in electronic commerce traffic, the method comprising:

defining, by one or more processors, a global conversion rate that represents activity related to a purchase made or proxy activity executed during electronic commerce traffic to a commercial website that is indicative of non-fraud activity, the global conversion rate representing a fraction of the electronic commerce traffic that leads to the purchase or the proxy activity; and monitoring, by the one or more processors, subsets of the electronic commerce traffic to a commercial website for clusters of activity having a conversion rate that is lower than a global conversion rate by a threshold margin, the conversion rate representing a fraction of a subset out of the subsets of the electronic commerce traffic that leads to the purchase or the proxy activity, the monitoring subsets of the electronic commerce traffic to the commercial website further including:

registering, by the one or more processors, a number of user-initiated input signals associated with an IP address to navigate from each of one or more affiliate websites to the commercial website, the IP address associated with geo-location data; and registering, by the one or more processors, a number of conversions generated from each of the one or more affiliate websites;

detecting, by the one or more processors, a change in the electronic commerce traffic in an amount of the electronic commerce traffic above or below a predetermined threshold;

scaling, by the one or more processors, the global conversion rate to be a scaled global conversion rate in accordance with the detected change, the scaling comprising adjusting, by the one or more processors, of a tunable parameter that modifies the global conversion rate, the adjusting based on the change;

comparing, by the one or more processors, the scaled global conversion rate to each of the conversion rates in order to detect anomalous conversion rates;

generating, by the one or more processors, a score for each user-initiated input signal, wherein the score ranks the pathology of the traffic related to the user-initiated input signal;

comparing, by the one or more processors, the score to a threshold;

detecting, by the one or more processors, anomalous conversion rates based on the comparing of the scaled global conversion rate to each of the conversion rates, based on the geo-location data, and based on scores exceeding the threshold; and providing, by the one or more processors, data encapsulating the detection of the anomalous conversion rates to a user interface.

12. A method in accordance with claim 11, further comprising applying a smoothing algorithm to the registered number of conversions generated from each of the one or more affiliate websites to generate a statistically smoothed sample to detect a sharp peak of the clusters of activity having the conversion rate that is lower than the global conversion rate.

13. A method in accordance with claim 11, wherein monitoring subsets of the electronic commerce traffic to the commercial website further includes tracking an IP address from which the user-initiated input signals from the input device are received.

14. A method in accordance with claim 11, wherein monitoring subsets of the electronic commerce traffic to the commercial website further includes tracking traffic for a selected advertising campaign related to the commercial website.

15. A system for detecting fraud in electronic commerce traffic, the system comprising:

a global conversion rate definition tool defining a global conversion rate that represents activity related to a purchase made or proxy activity executed during electronic commerce traffic to a commercial website that is indicative of non-fraud activity, the global conversion rate representing a fraction of the electronic commerce traffic that leads to the purchase or the proxy activity; and a web traffic monitor configured to monitor subsets of the electronic commerce traffic to a commercial website for clusters of activity having a conversion rate that is lower than a global conversion rate by a threshold margin, the conversion rate representing a fraction of a subset out of the subsets of the electronic commerce traffic that leads to the purchase or the proxy activity, the monitoring subsets of the electronic commerce traffic to the commercial website further including registering, by the one or more processors, a number of user-initiated input signals associated with an IP address to navigate from each of one or more affiliate websites to the commercial website, the IP address associated with geo-location data;

detecting, by the one or more processors, of a change in the electronic commerce traffic in an amount of the electronic commerce traffic above or below a predetermined threshold in which the change extends for a predefined threshold term;

scaling, by the one or more processors, the global conversion rate to be a scaled global conversion rate in accordance with the detected change, the scaling comprising adjusting, by the one or more processors, of a tunable parameter that modifies the global conversion rate, the adjusting based on the change;

comparing, by the one or more processors, the scaled global conversion rate to each of the conversion rates in order to detect anomalous conversion rates;

generating, by the one or more processors, a score for each user-initiated input signal, wherein the score ranks the pathology of the traffic related to the user-initiated input signal;

comparing, by the one or more processors, the score to a threshold;

detecting, by the one or more processors, anomalous conversion rates based on the comparing of the scaled global conversion rate to each of the conversion rates, based on the geo-location data, and based on scores exceeding the threshold; and providing, by the one or more processors, data encapsulating the detection of the anomalous conversion rates to a user interface.

16. A system in accordance with claim 15, wherein the web traffic monitor is further configured to:

register a number of conversions generated from each of the one or more affiliate websites.

17. A system in accordance with claim 16, further comprising a scoring tool configured to generate a score for each user-initiated input signal, wherein the score ranks the pathology of the traffic related to the user-initiated input signal.

* * * * *